Figure 1:
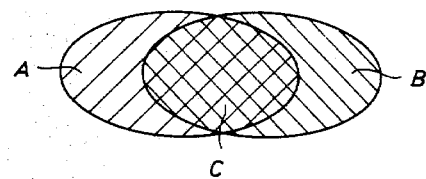
Figure 1:
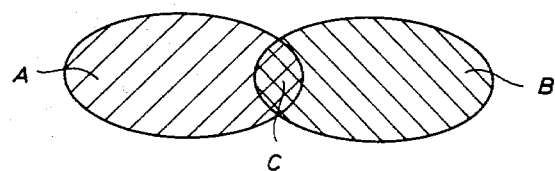

United States Patent [19]

Hartung

[11] 4,357,154
[45] Nov. 2, 1982

[54] METHOD AND APPARATUS FOR COLLECTING AND HANDLING MINERAL FIBRES

[75] Inventor: Willy Hartung, Skövde, Sweden
[73] Assignee: Rockwool Aktiebolaget, Sweden
[21] Appl. No.: 235,605
[22] Filed: Feb. 18, 1981

[30] Foreign Application Priority Data

Feb. 22, 1980 [SE] Sweden .............................. 8001396

[51] Int. Cl.³ ............................................. C03B 37/05
[52] U.S. Cl. ............................................. 65/8; 65/10; 65/12; 65/15; 209/3; 209/18; 209/173; 209/211
[58] Field of Search ..................... 209/173, 3, 211, 18; 65/2, 10, 8, 15, 14, 6

[56] References Cited

U.S. PATENT DOCUMENTS

| 2,668,667 | 2/1954 | Fern et al. | 209/173 X |
| 3,710,932 | 1/1973 | Bodine | 209/3 X |
| 3,883,334 | 5/1975 | Cassidy et al | 65/10 X |
| 4,251,320 | 2/1981 | Cederquist | 209/3 X |

Primary Examiner—Robert L. Lindsay, Jr.
Attorney, Agent, or Firm—Larson and Taylor

[57] ABSTRACT

A method and an apparatus for collecting and handling partly fibrated material which is formed by a partial fibrating of a mineral bloom (1), whereby the partially fibrated material is collected and brought into suspension in a water bath (11) in which the un-fibrated material is separated and the fibrated material is collected and removed for the manufacture of mineral fibre products. In the water bath (11) the fibre fraction and the partially fibrated material is kept in water suspension (by 12) whereas un-fibrated and more heavy material is allowed to sink to the bottom from which such material is removed (by 13). The collecting of the fibre material just formed is preferably made by flows of water (6, 7) and while suspending the fibre material in air (by 38, 40). The separation of fibre material is made by dynamical separation in one or several stages.

18 Claims, 4 Drawing Figures

METHOD AND APPARATUS FOR COLLECTING AND HANDLING MINERAL FIBRES

Mineral fibres can be manufactured in many different ways from blooms of mineralic materials. Basically there are three main methods:

(a) By a drawing operation
(b) By a blowing operation
(c) By a throwing operation The drawing operation gives a fibre mass substantially without any portion of unfibrated material. With some reserve this can also be said of the blowing operation in which the fibre formation is made by means of hot gas flows.

Otherwise the blowing and in front of all the throwing operations only give a partial fibrating of the supplied mineral wool since so called pearls are formed during the fibrating operation. In order to avoid such pearls from impairing too much the properties of the product it is generally tried to make a separation already during the fibrating process, generally by having an air or gas flow deflecting the partially fibrated material as appearing when leaving the point where the fibrating takes place. In practise the separation, however, is never perfect but in the best case a first fraction is obtained which is pearl-rich and fibre-poor and a second fraction is obtained which is fibre-rich and pearl-poor. As mentioned above the partition of said two fractions can be made more or less successfully.

This is illustrated in FIG. 1a and 1b of which FIG. 1a shows a little successful separation in that the pearls represented by the area A are incompletely separated from the fibres which are represented by the area B. The area C which is common for the two areas A and B represent the part of the partially fibrated flow of material in which pearls and fibres appear mixed up. Correspondingly FIG. 1b shows a more successful separation in which the comon field C occupies a much less part of the total flow of material.

Figure 2:
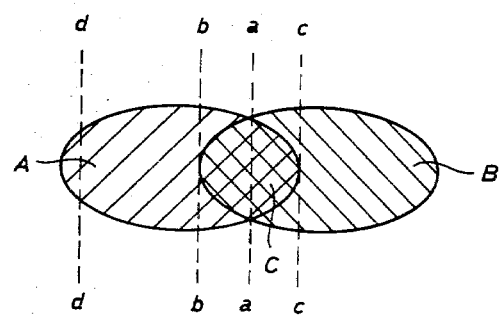

The partition may also be moved so that one of the fractions is more clean than the other. This is illustrated in FIG. 2. Also in this figure the area A represents the pearls and the area B represents the fibres. If the flow of material is now parted as indicated with line a—a two portions are obtained, one portion containing more pearls than fibres and the other portion of the opposite character. If it were possible to provide a partition as shown by line b—b one part flow should comprise only pearls, whereas the other part flow should comprise both fibres and some pearls. Another possible partition of interest is represented by line c—c which separates a fibre portion which is completely free from pearls.

For normal use of mineral fibres, especially fibres in the form of wool or insulating purposes a small portion of pearls is not particularly disadvantageous. For such use it is more essential that the largest possible portion of fibres be collected.

A partition between the two phases thereby generally is made somewhere between the lines a—a and b—b. The line b—b represents like the line c—c hypothetic partitions which cannot be obtained in practise in the present manufacturing process which are very stochastic to their nature. For such fields of use in which a fibre mass having an optimum little amount of pearls is wanted, for instance fibres for reinforcement of polymeric materials, there is in practice consequently no possibility of locating the line of partition to the line c—c. Even if this should be possible such partition would involve a large loss of fibres as represented by the portion of the area B which in FIG. 2 is located on the left hand side of the line c—c. For making it possible to make use of an optimum large amount of the fibres there has so far not been any other way than locating the line of partition so that most fibres are received in one fraction. The said fraction, which consequently contains a large amount of pearls, is thereafter moved to another station in which the material is dispersed in a water bath, preferably by means of a wetting agent as dispersing means. The fibre met supplied to the water bath often is present in wool form having a pellet like structure. When dispersing the said fibre met in the water bath any pellets are broken up into separate fibres. The dispersion thereby obtained may thereafter be subjected to more exactly functioning separation steps, for instance by means of some type of wet cyclones. Not until affter this is a pure fibre mass is obtained.

The fibre mass thus obtained does not contain all fibres which have been manufactured. If it should be desired to collect all fibres it will be necessary to include a substantial portion of the pearl fraction in the handled fraction. This is disadvantageous for two reasons. The wet cleaning system should be strongly loaded, and in front of all the fibres should be subjected to a damaging actuation by a large amount of pearls which naturally are cooled much slower than the fibres. The invention is based on the above analysis of the problems. The invention is useful when a mineralic bloom is partially fibrated, whether the fibrating process is made by a throwing operation from rotating fibrating wheels or by blowing or by any combination of said methods, and by which process it is intended to obtain a fibre mass which is as pure as possible.

According to the invention the partially fibrated material is directly introduced in a water bath and is dispersed without previously having been collected in a dry state. From the dispersion thereafter at least one fraction is collected which contains practically all fibres.

The part of the supplied bloom which is not transmitted in fibre form appears as small particles, so called pearls, or as large fibre lumps which are not especially regular. It may be suitable to remove the said large lumps separately from the system since this can be made relatively simply without bringing any fibres. The lumps thereby removed may for instance be washed after they have been removed from the system and the wash water is returned to the system. The removal of fibres from the dispersion can be made in one or several steps by any dynamic separation method, for instance by cyclones. From the remainder of the dispersion the other particles can be removed together with the fibres still appearing in the dispersion and be separated from the water phase. Also from the fibre dispersion or the fibre dispersions the water phase can be removed. This is possible by any known means like filter band presses, centrifuges.

The water thus removed is preferably returned in the process. The returning of the water is made for several different reasons. If the water is let out mileu problems may among other things appear and there is a need for a supply of raw water which in time becomes expensive. Further additives which for different reasons are supplied to the water, for instance the wetting agent are reused. Even if a little portion of the said additives follow the fractions of material which are removed from the system this is generally wanted and made intentionally, at least as concerns the fibre portion which brings the largest amount of water.

The water and possible additives which have been removed consequently must be compensated for in the system and likewise the water disappearing depending on evaporation must be compensated for. Also lost or used additives must be compensated for more or less continuously.

Together with the partially fibrated material supplied to the water bath and thereby to the water system as a complete heat energy is supplied to the water system which leads to a successive heating and to a saturation state giving a temperature which in addition to the supplied heat energy depends on intentional or un-intentional removal of heat. The un-intentional removal of heat appears depending on evaporation from the free surfaces of the system and heat emission from cisterns conduits, pumps etc.

To some extent such emission of heat can be controlled by ventilation in connection with a more or less complete encasing of the apparatus also as concerns evaporation and by isolation of the apparatus as concerns other heat emissions. The evaporation can be speeded up by blowing air through the system, and such blows of air also may serve as a means for providing a stirring operation.

Further heat emission can be provided by cooling means which are immersed in the system in the form of coils or batteries, or which preferably are inserted as separate elements in the system.

The invention will now be described more in detail with reference to the accompanying drawings. In the drawings FIGS. 1a, 1b and 2 diagrammatically illustrate different partitions of fractions having pure fibres, pure pearls or lumps or mixtures of said fractions.

Figure 3:
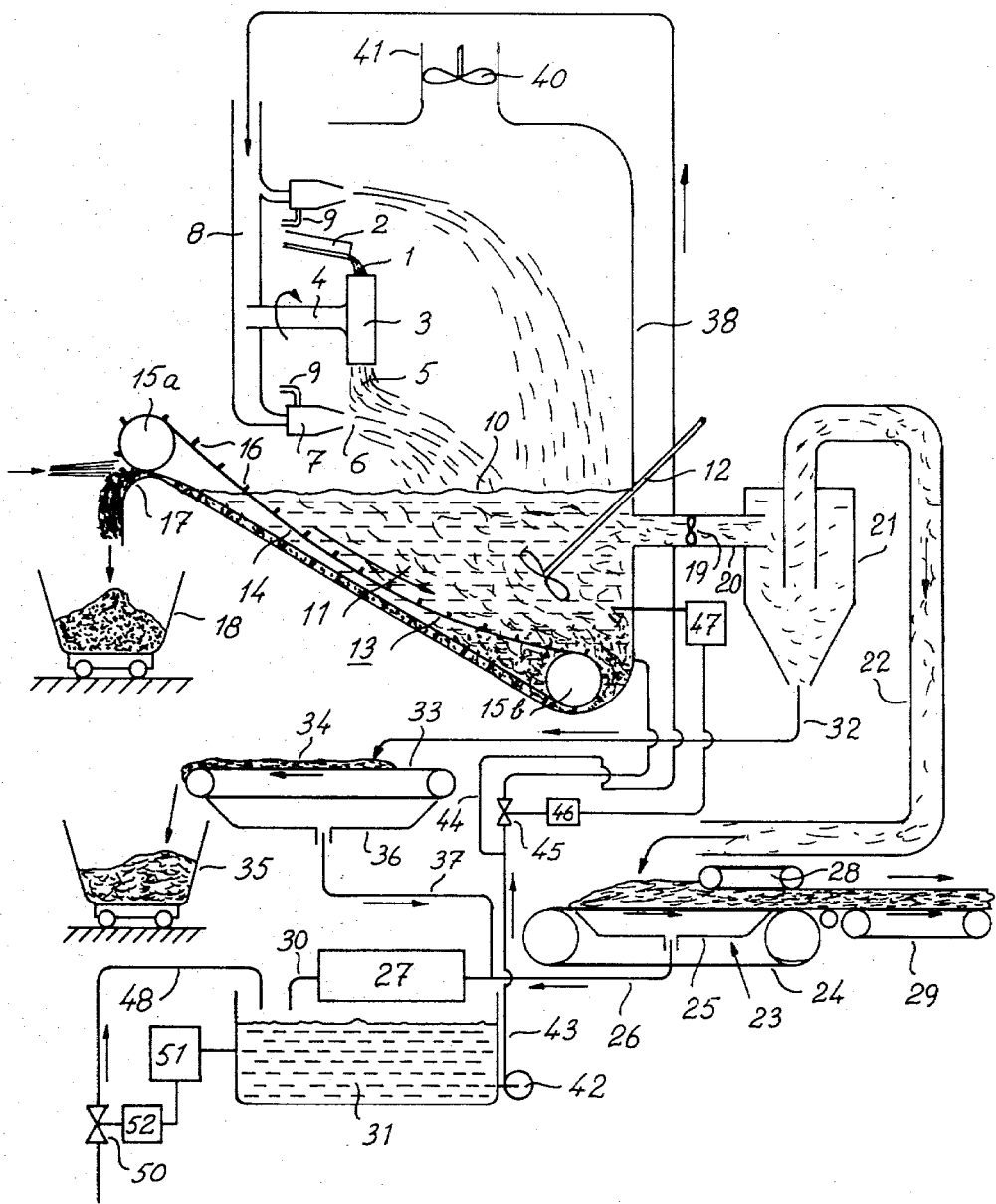

FIG. 3 diagrammatically illustrates an apparatus for executing the method according to the invention.

It is to be understood that the described method and the apparatus described in connection to FIG. 3 only are illustrative examples which do not restrict the invention over what is defined by the appended claims.

FIGS. 1a, 1b and 2 have carefully been described above, and further description seems superfluous.

In FIG. 3 is shown how a mineral bloom 1 is supplied from a flute 2 of melted mineralic material to a cylindrical body 3 rotating around a horizontal shaft 4. The cylindrical body 3 can be a conventional fibrating means having fibrating wheels. From the fibrating wheel 3 the mineral bloom 1 is thrown out in a radial plane in the form of a curtain 5 of fibres and un-fibrated particles, so called pearls or shots.

Some distance from the rotating body 3 the said curtain of fibres is hit by flows of fluid coming from nozzles 7 which are fed with water from a distribution conduit 8 and possibly also with pressurized gas from the conduit 9. The nozzles 7 are provided round the rotating body in such a way and are provided to issue a flow of such kind that the curtain of fibres and shots are deflected into a more or less horizontal path which depending on the action of gravity is more and more fold down to the surface 10 of a water bath 11 in a basin in which the material becomes wet and sinks down more or less quickly depending on the hydraulic diameters of the fibres and the shots.

A stirring gives some uniform distribution and keeps the water bath 11 in such movement that no fibres and not the smallest unfibrated particles may lie down on the bottom. Only the coarse unfibrated particles reach the bottom and the said particles are removed from the water bath by a slowly moving endless scraper band 13 comprising for instance two chains 14 extending round two pairs of chain wheels 15a and 15b, the upper pair of which is driving. Between the chains 14 parallel scraper bars 16 are mounted.

The scraper bars 16 of the chain part adjacent the bottom move along the bottom and thereby brings the coarse, un-fibrated melted particles, which have reached to bottom. Thereby the said particles are brought above the surface 10 of the water bath and over the upper edge 17 of the basin from which the particles thereby removed from the water bath drop down in the container 18.

By means of showers which in FIG. 3 are only intimated it is possible to have any fibres which may accompany the coarse particles up to the upper edge 17 of the basin to be washed back into the water bath, so that the material finally dropping down in the container 18 is practically completely free from fibres.

The suspension of mineralic material which is formed in the water bath 11 actuated by the stirring means 12 is pumped by means of a pump 19 through a conduit 20 to a cyclone 21. From the cyclone a fraction free from shots leaves from the conduit 22 and is supplied to a draining means which in the illustrated case is a strainer screen press 23.

On the water permeable strainer screen 24 of the said press the fibre containing suspension is spread from the conduit 22, whereby the main portion of the water is received in the vessel 25, from which it is transmitted to the filter 27 by the conduit 26. The purpose of the filter 27 is to save the pumps circulating the water in the system.

The fibres separated on the strainer screen 24 are further drained by the action of a press band 28 and are from there transmitted to a further handling station not illustrated in the drawings by means of conveyors 29.

The water from which mechanical impurities have been removed in the filter 27 is allowed to flow down into a buffer tank 31 through the outlet 30.

The reject flow 32 from the cyclone 21 is transmitted through a conduit to a draining means 33 of a type which is similar to the strainer screen press 23. The drained fixed material 34 is transmitted to a container 35. The separated water is collected in the vessel 36 and is by the conduit 37 transmitted to the filter 27 or a similar filter connected in parallel therewith.

Above the water bath 11 a cover casing 38 is mounted. The air volume enclosed by the casing is circulated by the fan 40 expelling the air through the pipe 41.

By means of the pump 42 water from the buffer tank 31 is moved first through the conduit 43 and thereafter through the conduit 44 to the distribution conduit 8.

Over another branch of the conduit 43 water is moved from the pump 42 to a valve 45, which by a servo mechanism 46 is controlled by a level sensing means 47 provided in the water bath 11.

Together with the fibre material on the conveyor 29, together with the material in the containers 18 and 35 and after evaporation through the draining conduit 41 water is removed from the system, and since the level of the water bath 11 is kept constant the level of the water in the buffer tank 31 in turn drops. Such dropping of the water level is counteracted by a supply, for instance of fresh water, from the conduit 48. The said supply of water is controlled by a valve 50, which in turn is actuated by a level sensing means 51 via a servo mechanism 52.

As mentioned above the system may preferably include a cooling means. Such cooling means are well known per se and may preferably be mounted in the buffer tank 31. The cooling, however may as well completely be accomplished depending on evaporation, especially from the water bath 11.

It is obvious to the expert in the field what changes and modifications can be made of the above described apparatus within the scope of the inventional concept as defined by the following claims.

I claim:

1. Method of collecting mineral fibres formed by a partial fibrating of a mineral bloom and containing both mineral fibres and un-fibrated particles and lumps of heavier material, which comprises supplying said partially fibrated material upon formation to a water bath by means of one or more flows of fluid which at least partly comprises water, said flow or flows of fluid directly introducing and dispersing the partially fibrated material in said water bath, allowing the un-fibrated particles to sink to the bottom of said bath while maintaining fibrated material in suspension and removing a fraction from said bath practically completely containing fibrated material.

2. Method according to claim 1, characterized in that the partially fibrated material is supplied to the water bath by means of one or more flows of fluid which at least partly comprises water.

3. Method according to claim 2, characterized in that the flow or flows of fluid act in a direction which is substantially perpendicular to the direction in which the partially fibrated material is thrown out from the place of fibrating.

4. Method according to claim 2 or 3, characterized in that the water contained in the flow or flows of fluid is a part of a recirculating water system in which the collecting water bath is included.

5. Method according to claim 4, characterized in that the suspension of water and partly fibrated material is maintained in such movement that practically no fibres can sediment.

6. Method according to claim 1, characterized in that the suspension of mineral fibres and water are subjected to a dynamic separation in one or several stages.

7. Method according to claim 6, characterized in that the dynamic separation is made by means of a wet cyclone.

8. Method according to claim 1, characterized in that several fractions are removed each of which contains practically only fibrated material but of different physical characters.

9. Method according to claims 1, 2, 3, 5, 6, 7, or 8, characterized in that the collecting of partly fibrated materail is made in a closed air chamber above the water bath, in which air chamber the air is circulated and exhausted by means of a fan.

10. Method according to claim 1, characterized in that the material which has sunk to the bottom of the water bath is removed by a scraper means acting at the bottom at the water bath.

11. Apparatus for collecting mineral fibers formed by a partial fibrating of a mineral bloom comprising
a means for forming a curtain of partly fibrated material from a mineral bloom,
a means for deflecting the partially fibrated material from the direction in which the material is thrown out from said fibrating means, said deflecting means comprising one or more flows of fluid which at least partly comprises water,
a water bath for collecting the partially fibrated material supplied by said flow or flows of fluid,
one or several means for accumulating un-fibrated material and
one or more means for collecting the fibrated material.

12. Apparatus according to claim 11, wherein the water bath includes a means for maintaining the fibre portion of the partly fibrated material in suspension while allowing un-fibrated and heavier material to sink to the bottom of the water bath.

13. Apparatus according to claim 11 including means for separating water from collected fibrated material.

14. Apparatus according to claim 11, 12 or 13 including means for recovering separated water and means for recirculating of recovered water to the water bath.

15. Aparatus according to any of claims 11 or 12 wherein a cover casing encloses the water bath and the means for forming the mineral fibres, said cover casing providing an air chamber in which the air is circulated and exhausted so that the mineral fibres formed in the casing are maintained suspended in air before they enter the water bath.

16. Apparatus according to any of claims 11 or 13 wherein the means for accumulating unfibrated material sunk to the bottom of the water bath comprises an endless rotatable scraper band which collects and removes the said material from the water bath.

17. Apparatus according to any of claims 11 or 13 including means for deflecting the partially fibrated material from the direction in which the material is thrown out from the fibrating means.

18. Apparatus according to claim 17, wherein the means for deflecting the partially fibrated material comprises nozzles ejecting jets of water in a direction perpendicuar to the direction of throwing out the mineral fibres from the fibrating means.

* * * * *